T. C. BENBOW.
WHEEL.
APPLICATION FILED JUNE 27, 1914.
1,138,442.
Patented May 4, 1915.
2 SHEETS—SHEET 1.
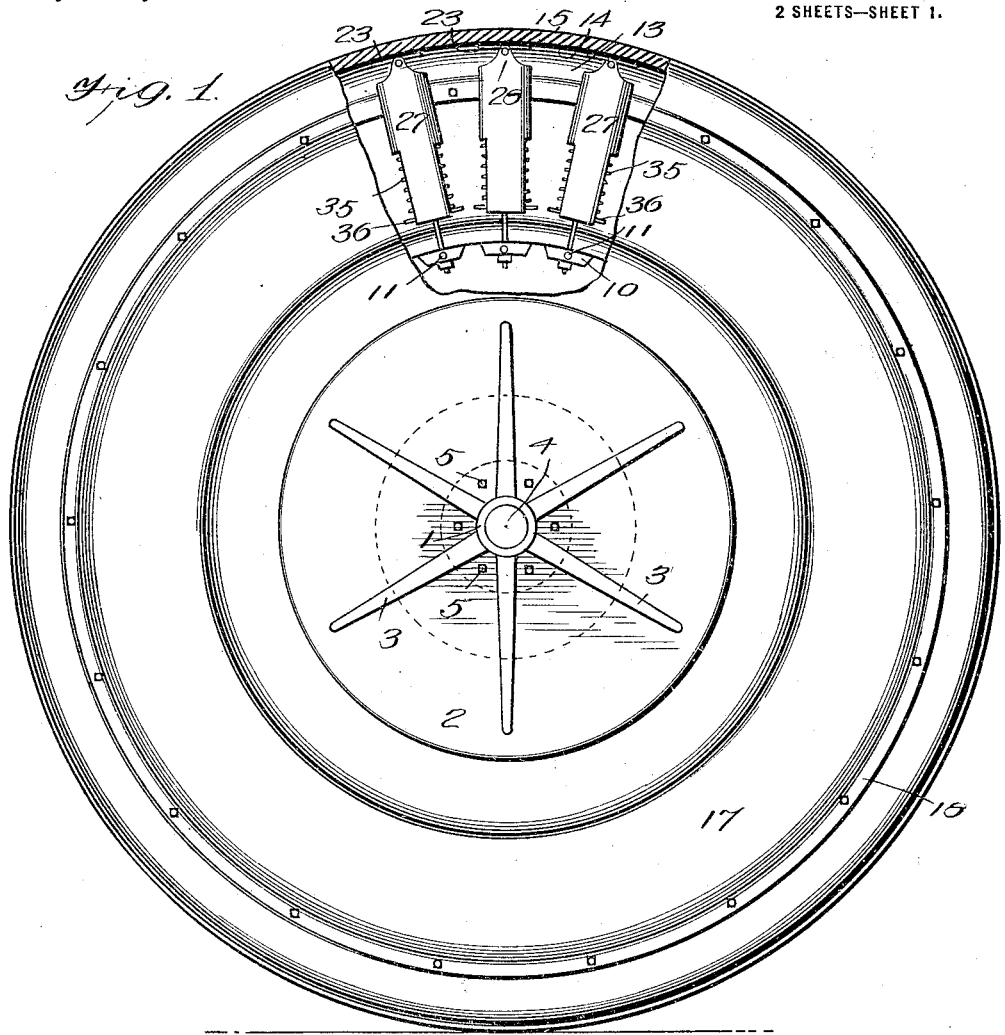
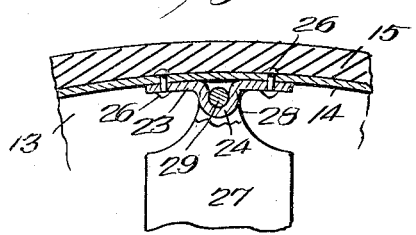
WITNESSES
INVENTOR
Thomas C. Benbow
BY
ATTORNEYS

T. C. BENBOW.
WHEEL.
APPLICATION FILED JUNE 27, 1914.

1,138,442.

Patented May 4, 1915.
2 SHEETS—SHEET 2.

WITNESSES
F. C. Barry
C. E. Pramer

INVENTOR
Thomas C. Benbow
BY Munn & Co.
ATTORNEYS

UNITED STATES PATENT OFFICE.

THOMAS C. BENBOW, OF ABSAROKEE, MONTANA.

WHEEL.

1,138,442.

Specification of Letters Patent.

Patented May 4, 1915.

Application filed June 27, 1914. Serial No. 847,684.

*To all whom it may concern:*

Be it known that I, THOMAS C. BENBOW, a citizen of the United States, and a resident of Absarokee, in the county of Stillwater and State of Montana, have made certain new and useful Improvements in Wheels, of which the following is a specification.

My invention is an improvement in wheels, and has for its object to provide a resilient wheel for use with motor vehicles, such as automobiles and the like, wherein cushioning elements are arranged within a tire for cushioning jar and shock, and wherein the tire is provided with a tread member, and wherein all of the cushioning mechanism is housed in such manner as to prevent the entrance of dust and the like, while at the same time the resiliency of the wheel is not impaired, and the wheel is not increased in size and does not differ greatly from the ordinary wheel.

Figure 4:
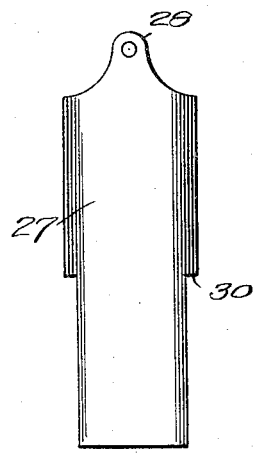
Figure 2:
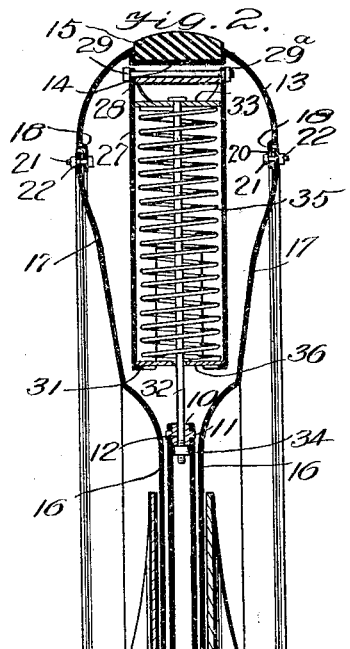
Figure 5:
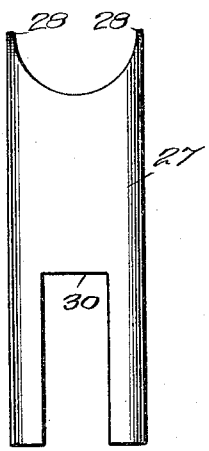
Figure 7:
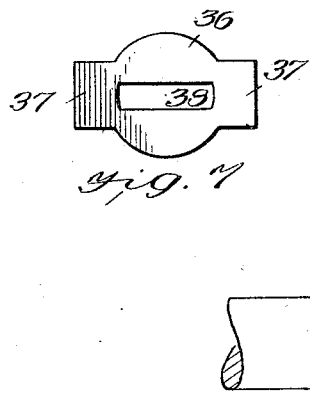
Figure 6:
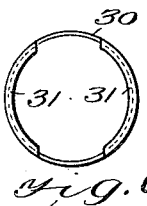
Figure 8:
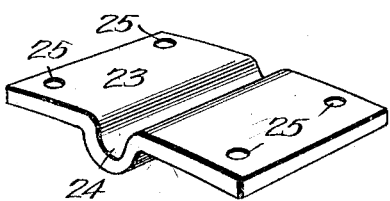
Figure 9:
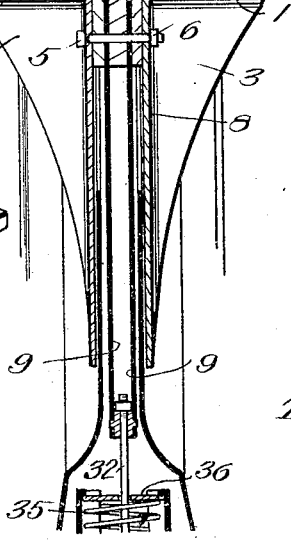

In the drawings: Figure 1 is a side view of a wheel constructed in accordance with the invention, with parts broken away, Fig. 2 is a transverse vertical section of the wheel, Fig. 3 is an enlarged section through the tread element and in the plane of the wheel, Fig. 4 is a side view of the housing for one of the cushioning elements, Fig. 5 is a view of the same at right angles to Fig. 1, Fig. 6 is an end view of the housing shown in Figs. 4 and 5, Fig. 7 is a top plan view of the movable disk, Fig. 8 is a perspective view of the bearing plate for the pivot pin that connects the housing to the outer rim, and Fig. 9 is a similar view of one of the blocks.

In the present embodiment of the invention the wheel consists essentially of a tire and a hub. The hub consists of sleeve sections 1, each having at its inner end a radial flange 2, and the flange of each section is braced against the sleeve or bushing 1 by means of radial reinforcing ribs 3 of right triangular shape. The sleeve sections are arranged in alinement, for engagement by the spindle 4 of the axle, and the flanges 2 are connected together in spaced relation, by means of bolts 5 and nuts 6. The bolts 5 are passed through the flanges which are arranged in parallel relation and spaced apart by a central washer 7 and lateral washers 8, and each bolt is engaged by the nut 6 to clamp the parts together. Disks 9 are arranged between each washer 8 and the washer 7, the disks having central openings for the spindle, and having openings for the bolts, and the disks extend beyond the peripheries of the flanges 2. The disks 9 are connected at their peripheries by the connecting blocks 10, shown in Fig. 9, the said blocks being arranged between the adjacent faces of the disks, and being arranged in spaced relation. Each block is provided with oppositely extending journal pins or trunnions 11, which engage registering openings in the disks near their peripheries, and each block is provided with an opening 12, radial to the spindle 4, and for a purpose to be later described.

The tire consists of an annular rim section 13, arc-shaped in cross section, and having a peripheral groove or recess 14, for receiving a solid tread member 15 of rubber or the like, which is seated in the groove or recess, filling the same. The side walls of the recess of groove 14 are parallel, and fit against the side edges of the tread member.

The housing 13 is somewhat greater than semi-circular in cross section, and the side edges are connected to lateral housing sections to be described. The housing sections are similar and oppositely arranged, each being of annular or ring form, and each section comprises a plane portion 16, and a flaring or frusto-conical portion 17, the said portions, however, being integral with the plane portions. The housing sections are arranged with their plane portions parallel, and with the flaring or frusto-conical portions 17 extending outwardly, and the plane portion of each housing section is received between the flange 2 of a hub section and the adjacent disk 9. The disks 9 as before stated extend beyond the peripheries of the flanges 2 and the peripheries of the said disks are at the junction of the flaring portions of the lateral housings with the plane portions. The inner edges of the lateral housings extend well beyond the peripheries of the flanges 2, and the side edges of the central housings are offset outwardly away from the flaring portion, as indicated at 18, to form a seat for receiving the adjacent side edge of the rim housing 13. The side edges of the central housings abut against the shoulders formed between the offset portions 18 and the body of the housing, and packings rings 20 are arranged between the outer faces of the side edges of the rim housing and the inner faces of the offset portions 18. Bolts 21 are provided for connecting the central housing and the lateral housing. The said bolts are passed through registering openings in the side edges of the lateral housings and in the offset portions 18 of the central housing, and each bolt is engaged by a nut 22 to hold the parts in place. Packing rings 20 are arranged between the offset portions of the central housing and the lateral housings. The bolts are passed from within outward, as shown, and the nuts are on the outer faces of the said portions of the lateral housings. Thus the wheel is housed, the rim housing 13 and the flaring portions of the lateral housings constituting the tire, while the plane portions of the lateral housings have guided movement between the disks 9 and the flanges 2.

The cushioning elements are arranged between the blocks 10 and the depressed portion or groove 14 of the rim housing. A bearing plate 23, one of which is shown in Fig. 8, is secured to the central housing 13 opposite each of the blocks 10, and in radial alinement with the trunnions 11 of the said block. Each of the bearing plates is provided with a transverse groove 24 at its center, and each plate is provided at each of its ends with a pair of openings 25. The plates are secured to the inner face of the groove or recessed portion 14 of the rim housing, by means of bolts 26 or the like, which are passed through the openings 25 and registering openings in the rim housing, and the said rivets are headed at both ends. A tubular housing 27 shown in Figs. 4, 5 and 6 is arranged at each bearing plate. Each of the housings 27 is provided at its upper end with oppositely arranged longitudinally extending perforated bearing lugs 28, and a bolt 29 is passed through the openings of the lugs and through the groove 24 to pivotally connect each tubular housing with the rim housing, and each bolt is engaged by a nut 29ª to hold it in place. At the opposite end from the lugs each of the housings 27 is provided with oppositely arranged longitudinally extending notches 30, the said notches or recesses extending approximately half the length of the housing, and at the end remote from the lugs 28 each housing has inwardly extending flanges 31. A rod 32 is arranged within each of the housings 27, at the axis thereof, and each rod is passed through a central opening in a disk 33 arranged within the housing near the upper end thereof, the head of the rod bearing against the outer face of the disk. The threaded end of each of the rods is passed through the opening 12 of the adjacent block 10, and a nut 34 is threaded on to each of the rods, on the inner face of the block. A coil spring 35 is arranged in each of the tubular housings between the disk 33 and a disk 36 seated on the flanges 31. Each of the springs bears at its inner end against the disk 36, the disk being supported by the flanges, and each of the disks 36 is provided with oppositely extending radial lugs 37, which extend through the notches or recesses 30 of the tubular housing, for preventing angular movement of the disk. Each disk 36 is provided with a slot 38, which extends in the same direction as the lugs 37, and the rod 32 passes through the slot. The rod may thus move angularly with respect to the disk 36, without interfering with the disk.

In the use of the improved wheel, the spindle 4 is cushioned against that portion of the tread which engages the ground by the springs 35. The spindle and the hub may move radially with respect to the tire, and whenever this movement takes place the springs 35 above and below the spindle are compressed. The rim is guided with respect to the spindle by the engagement of the plane portion 16 of the lateral housing between the disk 9 and the flanges 2. The spindle or hub is thus suspended in practically the same manner as in a wire wheel, and at the same time the suspension is resilient. The hub cannot move angularly with respect to the rim to any considerable degree, since the engagement of the rods 32 with the ends of the slot 38 would prevent such movement. The tire is connected to the hub by means of the rods 32. The blocks 10 are pivoted to swing on a transverse axis at their centers, so that a limited angular movement of the tire and the hub may take place. The springs 35 are however always compressed when there is angular movement of the tire and the hub, and they act at all times to return the parts to original position, and to hold them in such position. When throwing in the clutch to start an automobile, the cushioning element between the tire and the hub will absorb the entire shock of the starting, so that the wear and tear on the engine and the transmission is greatly reduced. In angular movement or in radial movement of the tire and the hub every spring is placed under different conditions from normal, and since the springs always tend to return to normal, there will be a perfect cushioning between the parts. All of the spring mechanism is housed, being thus protected from injury and from dirt, and the wheel when completed looks like an ordinary wheel.

I claim:

1. A spring wheel comprising a hub consisting of sleeve sections arranged in alinement, and each having at its inner end a radial continuous flange, bracing ribs integral with the flange and the sleeve and arranged between the flange and the sleeve, a pair of disks arranged between the flanges and the sleeve sections, means for securing the sleeve sections and the disks together in spaced relation, a tire comprising a housing consisting of a rim section arc-shaped in cross section and lateral sections, the rim section having a continuous peripheral groove or depression, a solid tread member seated in the depression, the lateral housing sections each comprising a plane portion received between a flange and the adjacent disk, and an outwardly flaring portion detachably connected at its outer edge with the adjacent side edge of the rim section of the housing, a series of blocks arranged between the disks at their periphery and in spaced relation, each block having intermediate its ends a pair of oppositely extending trunnions and the disks having openings in which the trunnions are journaled, and cushioning elements arranged between the blocks and the rim section at the groove or depression.

2. A spring wheel comprising a hub consisting of sleeve sections arranged in alinement, and each having at its inner end a radial continuous flange, bracing ribs integral with the flange and the sleeve and arranged between the flange and the sleeve, a pair of disks arranged between the flanges and the sleeve sections, means for securing the sleeve sections and the disks together in spaced relation, a tire comprising a housing consisting of a rim section arc-shaped in cross section and lateral sections, the rim section having a continuous peripheral groove or depression, a solid tread member seated in the depression, the lateral housing sections each comprising a plane portion received between a flange and the adjacent disk, and an outwardly flaring portion detachably connected at its outer edge with the adjacent side edge of the rim section of the housing, a series of blocks arranged between the disks at their periphery and in spaced relation, each block having intermediate its ends a pair of oppositely extending trunnions and the disks having openings in which the trunnnions are journaled, and a cushioning element arranged between each block and the rim housing, each of the said elements being pivoted to the rim housing at its outer end and adjustably connected with the block at its inner end.

THOMAS C. BENBOW.

Witnesses:
FRANK E. JAY,
LUDWIG C. FLEISHSEN.

Copies of this patent may be obtained for five cents each, by addressing the "Commissioner of Patents, Washington, D. C."